United States Patent
Delorme et al.

(10) Patent No.: US 9,533,757 B2
(45) Date of Patent: Jan. 3, 2017

(54) BUOYANCY SYSTEM FOR AN AIRCRAFT

(71) Applicant: AIRBUS HELICOPTERS, Marignane (FR)

(72) Inventors: Louis Delorme, Marseilles (FR); Nicolas Lamarche, Meylan-en-Yvelines (FR); David Ayache, Le Puy Sainte Reparade (FR); Bernard Certain, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 178 days.

(21) Appl. No.: 14/513,508

(22) Filed: Oct. 14, 2014

(65) Prior Publication Data

US 2015/0102164 A1   Apr. 16, 2015

(30) Foreign Application Priority Data

Oct. 16, 2013   (FR) ...................... 13 02395

(51) Int. Cl.
  *B64C 25/56*  (2006.01)
  *B64D 25/00*  (2006.01)
  *B64C 25/32*  (2006.01)

(52) U.S. Cl.
  CPC ............... *B64C 25/56* (2013.01); *B64D 25/00* (2013.01); *B64C 2025/325* (2013.01); *B64D 2201/00* (2013.01)

(58) Field of Classification Search
  CPC ........ B64C 25/54; B64C 25/56; B64C 35/001; B64C 35/002; B64C 35/003; B64C 35/008; B64D 25/18; B64B 1/68; B63B 43/10; B63B 43/16

(Continued)

(56) References Cited

U.S. PATENT DOCUMENTS

| | | | | |
|---|---|---|---|---|
| 1,199,690 A | * | 9/1916 | Gillan | ...................... F16B 5/06 24/581.1 |
| 1,221,496 A | * | 4/1917 | Wullyamoz et al. | ... B63B 43/16 114/227 |

(Continued)

FOREIGN PATENT DOCUMENTS

| | | |
|---|---|---|
| EP | 0193265 | 9/1986 |
| JP | S61171699 | 8/1986 |
| JP | 2010064697 | 3/2010 |

OTHER PUBLICATIONS

French Search Report for FR 1302395, Completed by the French Patent Office on Jun. 16, 2014, 6 Pages.

*Primary Examiner* — Joseph W Sanderson
(74) *Attorney, Agent, or Firm* — Brooks Kushman P.C.

(57) ABSTRACT

A buoyancy system (10) for an aircraft (1), the buoyancy system (10) being provided with at least one inflatable float (15). The buoyancy system (10) has at least one inflator (25) and at least one actuator (30) interposed between the inflator (25) and a float (15), the actuator (30) having a cylinder (35) and a rod (40) partially received in the cylinder (35). The rod (40) is secured to a piston (50) defining a first chamber (61) within the cylinder (35) and in fluid flow communication with the inflator (25), and a second chamber (62) within the rod (40) and in fluid flow communication with the float (15), and the piston (50) has a channel (63) to put the first chamber (61) into fluid flow communication with the second chamber (62), the deployment device (20) having a shutter (70) for shutting the channel (63).

20 Claims, 2 Drawing Sheets

(58) Field of Classification Search
USPC .................................. 114/292; 91/401, 167 R
See application file for complete search history.

(56) References Cited

U.S. PATENT DOCUMENTS

| | | | | |
|---|---|---|---|---|
| 1,918,426 | A * | 7/1933 | Radnor | B64C 25/10 244/101 |
| 2,131,528 | A * | 9/1938 | Soyer | B64C 35/003 244/107 |
| 2,271,065 | A | 1/1942 | Dornier, Jr. | |
| 2,563,263 | A * | 8/1951 | Nicholl | B64C 35/003 244/102 SL |
| 2,811,950 | A * | 11/1957 | Entz | B66F 3/25 254/93 R |
| 3,176,937 | A * | 4/1965 | Labrecque | B64C 25/56 244/101 |
| 3,240,449 | A | 3/1966 | Robinson, Jr. | |
| 3,321,158 | A | 5/1967 | Di Stasi | |
| 3,467,343 | A | 9/1969 | Violleau | |
| 3,506,222 | A * | 4/1970 | Anderson | B64C 25/56 244/101 |
| 3,507,466 | A * | 4/1970 | La Fleur | B64C 25/56 244/100 A |
| 4,655,415 | A | 4/1987 | Miller et al. | |
| 4,726,284 | A * | 2/1988 | Green | F15B 15/1414 91/401 |
| 7,434,600 | B1 * | 10/2008 | Swierkocki | B64C 25/56 141/46 |
| 7,644,739 | B1 * | 1/2010 | Vezzosi | B64C 25/56 141/46 |
| 2003/0057322 | A1 | 3/2003 | Parrott et al. | |
| 2003/0060101 | A1 * | 3/2003 | Parrott | B64C 25/56 441/40 |
| 2010/0044506 | A1 * | 2/2010 | Smith | B64C 25/10 244/101 |
| 2011/0006157 | A1 * | 1/2011 | Vezzosi | G05G 1/04 244/107 |
| 2011/0049294 | A1 * | 3/2011 | Morley | B64C 25/56 244/107 |
| 2014/0145030 | A1 * | 5/2014 | Bardy | B64C 25/56 244/107 |
| 2014/0252165 | A1 * | 9/2014 | Smith | B64C 25/54 244/105 |
| 2014/0252166 | A1 * | 9/2014 | Smith | B64C 25/56 244/107 |
| 2015/0102164 | A1 * | 4/2015 | Delorme | B64C 25/56 244/105 |

\* cited by examiner

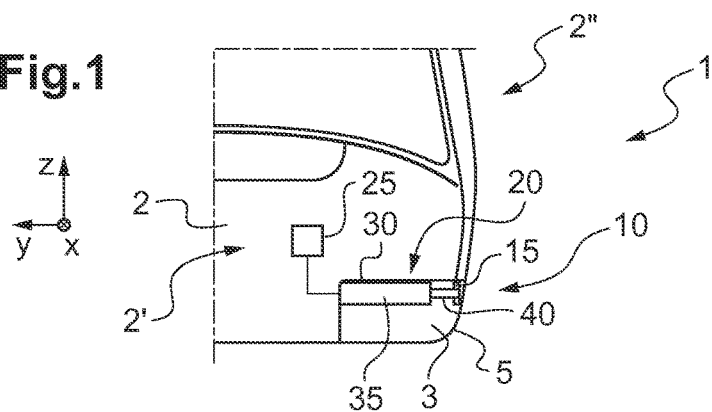
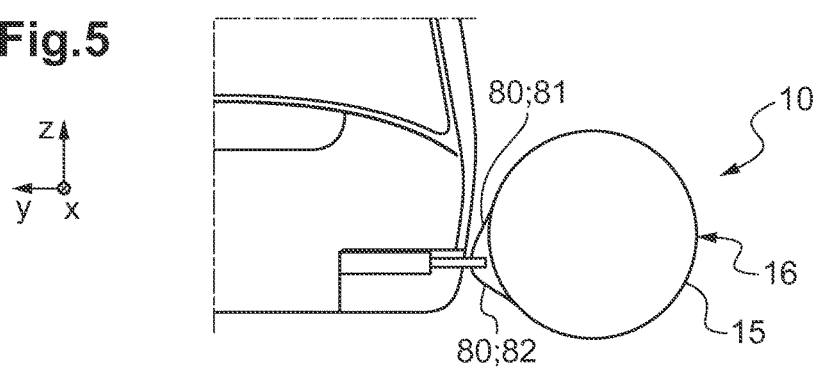
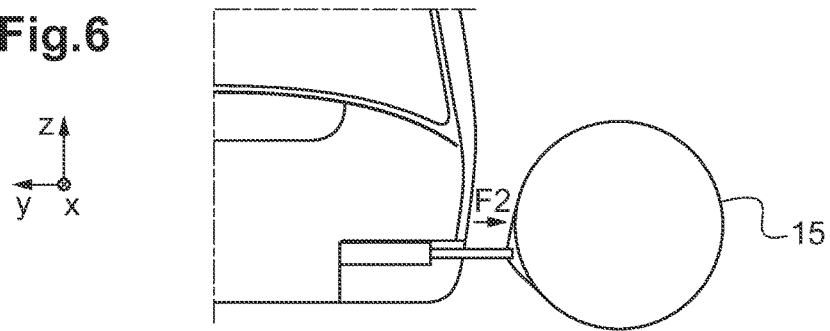
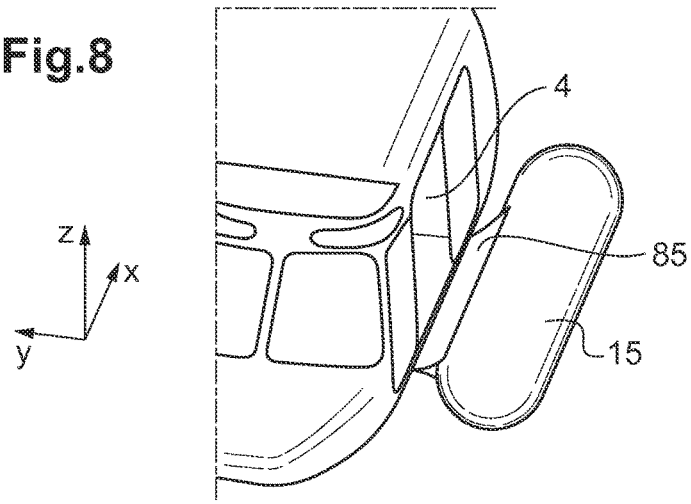

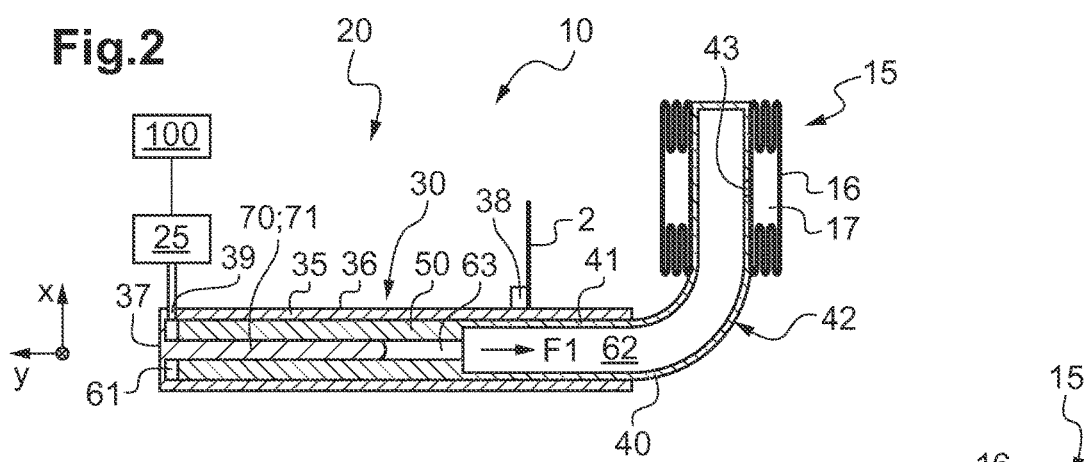
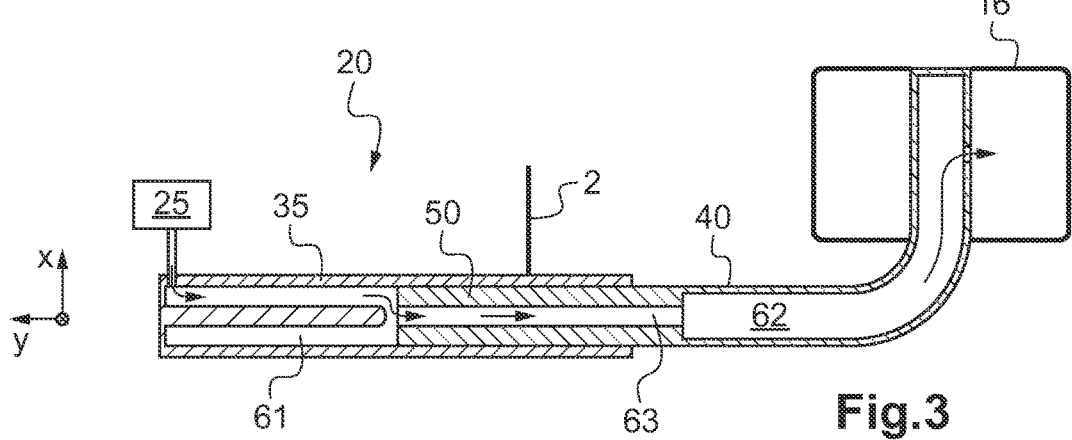
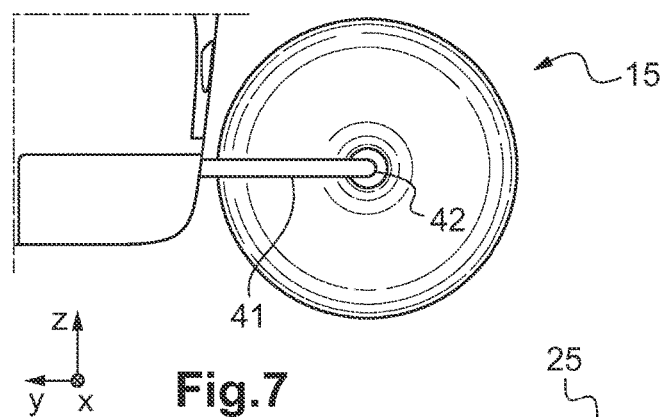

BUOYANCY SYSTEM FOR AN AIRCRAFT

CROSS REFERENCE TO RELATED APPLICATION

This application claims priority to French patent application No. FR 13 02395 filed on Oct. 16, 2013, the disclosure of which is incorporated in its entirety by reference herein.

BACKGROUND OF THE INVENTION (1) Field of the Invention

The present invention relates to a buoyancy system for an aircraft, and to an aircraft having such a buoyancy system.

Under such circumstances, the invention relates to the technical field of buoyancy systems enabling an aircraft to land on water and be stable thereon, and in particular making that possible for a rotary wing aircraft.

(2) Description of Related Art

Such a buoyancy system contributes to providing an aircraft with buoyancy and stability after landing on water. The buoyancy system may be used for example as a result of a forced landing on water (ditching), in order to enable the occupants to evacuate the aircraft. All aircraft that perform missions of transporting people over areas of sea should in principle be provided with such a buoyancy system.

Certification regulations also specify that an aircraft must be capable of landing on water and of remaining stable thereon when using its buoyancy system. Stability should be ensured for water surface states and wind levels that are defined in certification regulations.

Those water surface states are known as "sea conditions" and they apply to any liquid surface. The term "landing on water" thus covers an aircraft "landing" on any free water surface, whether at sea, or on a lake, for example.

The buoyancy system may comprise floats that are deployed either by the pilot and/or the copilot, for example, or else by automatic triggering, in particular by using one or more immersion sensors. The floats may comprise bags that are inflatable by explosive or electric deployment means, for example.

By way of example, Document EP 0 193 265 B1 discloses a buoyancy system having inflatable buoyancy bags that are fastened to landing gear.

Document US 2003/0057322 also discloses a buoyancy system attached to landing gear.

A buoyancy system may also comprise structural floats that are not inflatable.

Thus, buoyancy systems are known that are provided with floats fastened to an aircraft fuselage.

Document JP 61-171699 and Document US 2003/0057322 disclose a buoyancy system attached to a helicopter skid.

Document U.S. Pat. No. 3,467,343 describes a buoyancy system having vertical floats that are inflated with compressed air. The floats are provided with wheels operated by hydraulic actuators.

Document JP 2010 064697 (Nat Univ Yokohama) describes an aircraft having a fuselage and two floats. Resilient means serve to move the floats outwards.

Document U.S. Pat. No. 2,271,065 (Dornier Jr Claudius) describes an aircraft having two retractable floats that move away from a fuselage before landing on water.

Also known are Documents U.S. Pat. No. 3,321,158 and U.S. Pat. No. 3,240,449.

BRIEF SUMMARY OF THE INVENTION

An object of the present invention is thus to provide an aircraft having good stability after landing on water.

The invention seeks in particular to provide a buoyancy system comprising at least one inflatable float, e.g. two floats arranged on either side of a fuselage of the aircraft. Such a fuselage extends longitudinally from a front end towards a rear end, and transversely from a right flank towards a left flank.

The buoyancy system includes at least one deployment device comprising an inflator and at least one actuator interposed between the inflator and a float. The actuator has a cylinder and a rod secured to a float, the rod being inserted in part in the cylinder and being slidable relative to the cylinder. Furthermore, the rod is secured to a piston, the piston co-operating with the cylinder to define a first chamber within the cylinder and co-operating with the rod to define a second chamber within the rod, the first chamber being in fluid flow communication with the inflator, while the second chamber is in fluid flow communication with the float. Under such circumstances, the piston has a channel for putting the first chamber into fluid flow communication with the second chamber, the deployment device having a shutter for shutting the channel in a refracted position of the actuator so that gas fed to the first chamber causes the actuator to extend by the rod moving in translation and for not shutting the channel in an extended position of the actuator after said movement in translation, in order to enable the gas to inflate the float.

The buoyancy system may comprise one deployment device of this type per float. Possibly, an inflator may be common to all of the deployment devices.

Each float may thus be fastened to the rod of at least one actuator. Nevertheless, a deployment device may comprise a plurality of actuators for deploying a single float.

In this context, a float is not inflated and is stored by way of example in a compartment of the aircraft that may be closed or open to the outside. Each actuator is then in a retracted position in which its shutter shuts the channel in the piston of the actuator.

When landing on water, the compartment may be opened, where appropriate.

During a first stage of operation, an inflator conveys gas to an actuator, and more particularly to its first chamber.

Such an inflator may be a conventional inflator, e.g. conveying air to at least one actuator. Any type of inflator may be used. The inflator may be controlled by a conventional trigger device, which may be automatic or manual.

While the channel and the piston of the actuator is shut, the pressure that exists in the first chamber increases as a result of the arrival of gas coming from the inflator, and thus causes the rod of the actuator to move in translation relative to the cylinder. The length of the actuator increases, thereby moving the float away from the fuselage of the aircraft.

During a second stage of operation, the shutter releases the channel in the piston. The gas produced by the inflator then escapes from the first chamber so as to inflate the float by passing in succession through the piston and then the rod of the actuator.

This buoyancy system thus enables a float to be inflated and enables the float to be moved away from the fuselage of the aircraft. By moving the float away from the fuselage, the buoyancy system improves the stability of the aircraft on water.

For constant stability relative to a conventional aircraft, the invention can thus give rise to a saving in weight.

Likewise, for equivalent size of floats relative to a conventional aircraft, the invention enables satisfactory stability to be achieved in sea conditions that are more penalizing.

As an illustration, the stability level of an aircraft may be multiplied by a coefficient greater than one, e.g. a coefficient equal to two, by moving the floats away from the fuselage through a distance equal to 300 millimeters (mm).

The buoyancy system may also include one or more of the following characteristics.

Thus, the shutter of a buoyancy system may include a finger extending in the cylinder of the deployment device, the finger penetrating into the channel when the actuator is retracted.

During the first stage of operation, the piston slides along the finger. When the piston separates from the finger, the channel in the piston is no longer shut and it puts the first and second chambers of the actuator into fluid flow communication. The shutter thus represents a mechanical device that is relatively simple.

By way of example, the finger is secured to an end wall of the cylinder. The end wall and the piston of the cylinder then define the first chamber of the actuator in the longitudinal direction. It can be understood that the finger extends longitudinally inside the cylinder over a length that is shorter than the length of the cylinder so as to enable the piston to separate from the finger.

Furthermore, the actuator optionally includes an abutment to limit the extent to which the rod can be extended out from the cylinder.

Also, the deployment system may include at least one strap fastened to the float in order at least to limit the freedom of movement of the float relative to the actuator.

This deployment device may comprise a top strap connected to a top portion of the float and a bottom strap connected to a bottom portion of the float, e.g. in order to prevent the float from turning relative to the actuator.

Optionally, at least one strap extends between the cylinder of an actuator and an outer envelope of the float.

In another alternative, the strap extends between the envelope of the float and the fuselage of the aircraft.

In another variant, the rod of an actuator includes an elongate portion slidably received in the cylinder and followed by an angled portion passing through a hollow float in its center.

The float may then represent a balloon that is hollow in its center for passing the angled portion of the rod. This variant makes it possible in particular to avoid using straps for the purpose of preventing the float from moving relative to the fuselage. However, it can be understood that the length of the actuator must be maximized in order to move the float away from the fuselage.

Furthermore, the deployment device includes at least one apron sheet fastened to a float in order at least to limit entry of water into a cabin facing the float. After a float has been deployed, the apron sheet is then stretched between the water and the cabin.

The apron sheet may be stretched between a float and the fuselage of the aircraft, being fastened to the fuselage or to an actuator of a deployment device, for example.

The deployment device may include means for extending the actuator in order to cause its rod to move in translation relative to the cylinder after a float has been inflated.

For example, a float is then deployed in three stages. During a first stage of operation, the actuator is extended in part in order to enable the float to be inflated, and then during a second stage of operation the float is inflated. Finally, during a third stage of operation, the actuator is extended fully.

Thus, the first two stages of operation can take place in flight. Since the length of the actuator is not at its maximum at the end of the second stage of operation, the forces exerted on the buoyancy system while making contact with the water are limited. Once on the water, the third stage begins in order to improve the stability of the aircraft on the water.

The extension means may comprise the inflator, with the third stage beginning from a threshold pressure being reached in the first chamber.

The extension means may also comprise dedicated means, such as an electric motor for moving the rod, for example.

Alternatively, the float may be deployed in two stages, comprising a stage in which it is extended fully followed by a stage in which the float is inflated.

In addition to a buoyancy system, the invention provides an aircraft having a fuselage and such a buoyancy system. The cylinder of an actuator of the deployment device is then fastened to the fuselage.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a section of an aircraft of the invention shown with a non-deployed float;

FIGS. 2 and 3 are sections showing an actuator of the invention;

FIG. 4 is a diagram explaining how an actuator of the invention extends;

FIG. 5 is a section of an aircraft of the invention shown with a float while it is being deployed;

FIG. 6 is a section of an aircraft of the invention shown with a float that is deployed;

FIG. 7 is a section of an aircraft of the invention provided with an angled rod; and FIG. 8 is a view of an aircraft of the invention provided with an apron sheet secured to a deployed float.

Elements present in more than one of the figures are given the same references in each of them.

DETAILED DESCRIPTION OF THE INVENTION

It should be observed that three mutually orthogonal directions X, Y, and Z are shown in some of the figures, namely a first direction X, a second direction Y, and a third direction Z.

FIG. 1 shows an aircraft 1 of the invention.

The aircraft comprises a fuselage 2 extending lengthwise from a front end 2' to a rear end. The fuselage 2 also extends widthwise from a left flank 2" to a right flank, and in elevation from a bottom portion towards a top portion.

The bottom portion is conventionally provided with landing gear, while the top portion may carry a rotor for providing lift and indeed propulsion. The bottom portion may include a lower section defined in particular by the floor of a cabin and the outer shell of the fuselage.

The aircraft 1 is provided with a buoyancy system 10 of the invention in order to be able to land on water.

Such a buoyancy system is provided with at least one float, e.g. with at least two floats 15 arranged on either side of the fuselage 2 of the aircraft. Thus, a first float is arranged beside the left flank of the aircraft, while a second float is arranged beside the right flank of the aircraft.

The floats may be paired. Under such circumstances, the floats of a pair may be arranged symmetrically on either side of an anteroposterior plane of symmetry of the aircraft in a stable position of the aircraft. For example, the aircraft may have a single pair of floats 15.

The floats are inflatable floats. Other than during stages of landing on water, each float may be folded in a compartment 3 of the aircraft, which compartment is possibly closed in flight by a cover 5 or the equivalent. A float then includes an inflatable bag defined by an outer envelope.

With reference to FIG. 2, each float is inflated by a deployment system 20 for deploying the buoyancy system.

Such a deployment system 20 is provided with at least one actuator 30 communicating with an inflator 25 and a float 15. The deployment device also includes an automatic or manual trigger device 100 for controlling the inflator 25.

The actuator 30 is provided with a cylinder 35 that is fastened to the fuselage 2. To this end, the cylinder 35 may include conventional fastener means 38. The cylinder 35 is thus secured to the fuselage 2, e.g. within a compartment 3.

The cylinder 35 is hollow. Thus, the cylinder may be provided by a blind cylindrical tube 36. The cylindrical tube 36 extends longitudinally from a first end that is closed by an end wall 37 towards a second end that is not closed. The cylindrical tube may also have an opening 39 connected to the inflator 25.

The actuator 30 also possesses a hollow rod 40 that slides relative to the cylinder 35. The rod 40 extends in part inside the cylinder 35 and in part outside the cylinder 35. Thus, the rod 40 may be provided with a hollow tube extending from a first end section present in the cylinder 35 towards a second end section present outside the cylinder.

The rod 40 is movable in translation relative to the cylinder 35 in order to increase or decrease the length of the actuator respectively for the purposes of moving a float away from or towards the fuselage 2. An abutment (not shown) may serve to limit the extent to which the actuator is extended. Such an abutment may comprise a shoulder on the rod co-operating with a shoulder on the cylinder, for example.

Furthermore, the first end section of the rod 40 is secured to a piston 50. This piston 50 consequently defines longitudinal ends of a first chamber 61 inside the cylinder 35, and of a second chamber 62 inside the rod 40.

In contrast, the second end section of the rod 40 is fastened to an envelope 16 of a float 15. Other than during stages of landing on water, the envelope 16 is folded. It should be observed that the rod includes at least one orifice 43 putting the second chamber 62 into communication with the inside 17 of the float 15.

Consequently, the first chamber 61 is in fluid flow communication with an inflator via the opening 39 and possibly via pipework, once the second chamber 62 is in fluid flow communication with a float via each orifice 43 and possibly via pipework.

Furthermore, a channel 63 runs longitudinally through the piston 50 so as to put the first chamber 61 into fluid flow communication with the second chamber 62. At least one gasket may be interposed between the cylinder 35 and the rod 40 in order to prevent any other fluid flow communication between the first chamber 61 and the second chamber 62.

The deployment device then includes a shutter 70 for shutting or releasing the channel 63. Such a shutter may comprise a finger 71 that is engaged inside the channel 63. Thus, the actuator may include a finger 71 extending longitudinally inside the cylinder 35 from the end wall 37. When the actuator is retracted, the finger 71 is engaged in the channel in order to prevent fluid flow communication between the first chamber 61 and the second chamber 62. Conversely, when the actuator is extended, at least in part, the finger 71 is no longer engaged in the channel 63, thereby allowing fluid flow communication between the first chamber 61 and the second chamber 62.

During a first stage of operation seeking to deploy a float 15, the inflator conveys a gas to the actuator, which gas may be air or an inert gas, for example. The gas penetrates into the first chamber 61 via the opening 39. Since the channel 63 in the piston is closed by the shutter, the pressure of the gas inside the first chamber increases.

This pressure exerted by the gas on the piston 50 causes the rod to move in translation along arrow F1. The rod, and in particular its second end portion carrying the float, then projects out from the fuselage of the aircraft, as shown in FIG. 4.

At the end of the first stage of operation, the finger 71 is no longer inserted in the channel 63, thus enabling the second stage of operation to be triggered.

During this second stage of operation, as shown in FIG. 3, the gas produced by the inflator is conveyed to the float successively via the first chamber 61, the channel 63, and then the second chamber 62. This gas then serves to inflate the float.

At the end of the second stage of operation, the float is inflated, as shown in FIG. 5.

Optionally during a third stage of operation as shown in FIG. 6, the inflator continues to convey gas to the actuator in order to cause the actuator to be extended fully in the direction of arrow F2.

The inflator thus represents extension means serving to extend the actuator 30 by causing the rod 40 to move in translation relative to the cylinder 35 after a float 15 has been inflated.

Extension of the actuator then takes place during the first stage of operation and also during the third stage of operation. For example, the first stage of operation takes place before landing on water, while the third stage of operation may take place after landing on the water, in order to limit the forces exerted by the water on the actuator while the aircraft is settling on the water.

Furthermore, the deployment device may include at least one strap 80 (shown in FIGS. 5 and 6) for limiting the movements of a float 15 relative to an actuator.

By way of example, the deployment device has a top strap 81 and/or a bottom strap 82 fastened respectively to a top portion and to a bottom portion of the float. The term "top" and "bottom" should be considered relative to the gravity direction.

Each strap is then connected to an actuator or to the fuselage of the aircraft.

As a variant, or in addition, the first end section may be a straight portion 41 of the rod, while the second end section 42 may be a section that is angled so as to pass through the center of the float.

With reference to FIG. 7, the rod then passes through the float, thereby serving to limit the freedom of the float to move.

FIG. 8 also shows a deployment device having an apron sheet 85. The apron sheet 85 extends from the float to at least one actuator or to the fuselage of the aircraft. The apron sheet may serve to limit the amount of water that splashes into the cabin 4 of the aircraft.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

In particular, the buoyancy system may include at least one deployment device. For example, the system may have a single deployment device provided with an inflator that is connected to a plurality of actuators for deploying and inflating all of the floats. Alternatively, the system may have one deployment device per float, each deployment device having at least one inflator connected to at least one actuator.

The inflator may optionally suck out the air present in a float 15 in order to retract such a float after landing on water has terminated.

What is claimed is:

1. A buoyancy system for an aircraft, the buoyancy system comprising:
an inflatable float; and
a deployment device comprising an inflator and an actuator interposed between the inflator and the float, the actuator having a cylinder and a rod secured to the float, the rod being inserted in part in the cylinder and being slidable relative to the cylinder, the rod being secured to a piston, the piston co-operating with the cylinder to define a first chamber within the cylinder and co-operating with the rod to define a second chamber within the rod, the first chamber being in fluid flow communication with the inflator, while the second chamber is in fluid flow communication with the float, the piston having a channel for putting the first chamber into fluid flow communication with the second chamber;
the deployment device having a shutter for shutting the channel in a retracted position of the actuator so that gas fed to the first chamber causes the actuator to extend by the rod moving in translation and for not shutting the channel in an extended position of the actuator after the movement in translation, in order to enable the gas to inflate the float.

2. The buoyancy system according to claim 1, wherein the shutter includes a finger extending in the cylinder, the finger penetrating into the channel when the actuator is retracted.

3. The buoyancy system according to claim 2, wherein the finger is secured to an end wall of the cylinder.

4. The buoyancy system according to claim 1, wherein the actuator includes an abutment to limit the extent to which the rod can be extended out from the cylinder.

5. The buoyancy system according to claim 1, wherein the deployment device includes a strap fastened to the float in order at least to limit the freedom of movement of the float relative to the actuator.

6. The buoyancy system according to claim 5, wherein the strap extends between the cylinder and an outer envelope of the float.

7. The buoyancy system according to claim 1, wherein the deployment device includes at least one apron sheet fastened to the float in order at least to limit entry of water into a cabin facing the float.

8. The buoyancy system according to claim 1, wherein the float is hollow and has a hollow float center, and the rod includes an elongate portion slidably received in the cylinder and followed by an angled portion passing through the hollow float center.

9. An aircraft provided with a fuselage, wherein the aircraft includes the buoyancy system according to claim 1, the cylinder being fastened to the fuselage.

10. The aircraft of claim 9, wherein the cylinder is secured inside a compartment in the fuselage on a first side of the fuselage.

11. The aircraft of claim 9, further comprising a second inflatable float in fluid connection with a second deployment device, the second inflatable float being disposed on a second side, opposite a first side, of the fuselage.

12. A buoyancy system for an aircraft, the buoyancy system comprising:
an inflatable container defined by an outer envelope enabled to hold pressurized gas; and
a deployment device having an inflator and an actuator, the actuator being interposed between the inflator and the container, the actuator having a cylinder, a piston, and a rod, the rod having a first end section and a second end section, the first end section of the rod being disposed in the cylinder and slidable relative to the cylinder, the second end section of the rod being secured to the container, and the first end section of the rod being secured to a piston;
the piston cooperating with the cylinder and the rod to define a first chamber within the cylinder and a second chamber within the rod, the second chamber being interposed between the piston and the container;
the piston further comprising a channel fluidly communicating the first chamber with the second chamber; and
the first chamber fluidly communicating with the inflator and the second chamber fluidly communicating with the container such that entry of pressurized gas into the first chamber moves the actuator in translation from a retracted position to an extended position, allowing pressurized gas to inflate the container.

13. The buoyancy system of claim 12, further comprising pipework fluidly communicating the first chamber with the inflator.

14. The buoyancy system of claim 12, further comprising pipework fluidly communicating the second chamber with the container.

15. The buoyancy system of claim 12, where the inflator is configured to remove pressurized gas from the container to retract the container.

16. The buoyancy system of claim 12, further comprising a shutter for selectively shutting and opening the channel within the piston.

17. A buoyancy system for an aircraft, the buoyancy system comprising:
an inflatable envelope capable of holding pressurized gas; and
a deployment device in fluid communication with the envelope, the deployment device having an inflator and an actuator disposed between the inflator and the envelope, the actuator having a cylinder, a piston, and a rod having a first end section and a second end section, the first end section of the rod slidingly disposed within the cylinder, the second end section of the rod being connected with the envelope, and the first end section of the rod being connected with a piston;
the piston cooperating with the cylinder and the rod to define a first chamber within the cylinder and a second chamber within the rod, the second chamber disposed between the piston and the envelope;
the piston fluidly communicating the first chamber with the second chamber, with the first chamber fluidly communicating with the inflator and the second chamber fluidly communicating with the envelope.

18. The buoyancy system according to claim 17, wherein the deployment device extends the actuator in order to cause the rod to move in translation relative to the cylinder as a result of the envelope being inflated.

19. The buoyancy system of claim 17, further comprising pipework fluidly communicating the first chamber with the inflator.

20. The buoyancy system of claim 17, further comprising pipework fluidly communicating the second chamber with the envelope.

* * * * *